UNITED STATES PATENT OFFICE.

FÉLIX GROGNET, OF NANTERRE, FRANCE.

METHOD OF STERILIZING RAW MEAT.

SPECIFICATION forming part of Letters Patent No. 642,221, dated January 30, 1900.

Application filed June 15, 1898. Serial No. 683,501. (No specimens.)

*To all whom it may concern:*

Be it known that I, FÉLIX GROGNET, a citizen of the French Republic, residing at Nanterre, France, have invented a certain new and useful Improved Process for Obtaining Sterilized Raw Meat in the Condition of Powder, of which the following is a description.

The object of this novel process is to produce for alimentary purposes in general, and more especially for military and naval forces, explorers, &c., a readily transportable product capable of furnishing at any moment an excellent article of food possessing the same nutritive properties as fresh meat. The meat is not deprived of any portion of its fibrine, soluble albumen, or other nutritious constituents, and it may be prepared for consumption in a few minutes.

By way of example I may state that after ten minutes' boiling a perfect gravy, soup, or broth may be obtained and that the meat which then remains at the bottom of the vessel in a hashed condition is precisely similar to that which is removed from a saucepan at the end of from four to six hours.

This powdered raw meat is rendered inalterable for an indefinite period.

The process is as follows: Fresh meat is grated very superficially in order that the fibers may remain adhering one to the other (so as to facilitate the manipulation) and then placed upon a sieve with a suitable quantity of lentil-flour, wheaten flour, pea-flour, or any similar flour. The meat adheres to this flour, and the operative leaves it in this state for several minutes—as long as he considers suitable—and then separates the meat from the flour in excess. The meat is then sterilized from all germs, spores, microbes, or the like which may have been generated either during this process, at the time of slaughtering, or during transport.

In order to sterilize the meat, it is dipped for one or two seconds in a bath the composition of which may vary indefinitely both as to time and proportions, but which forms a part of the present invention, the composition given being that which experience has shown to be most advantageous.

*Composition of the bath.*—Wine vinegar at 2°, one hundred kilograms; common cooking salt, four kilograms; crushed ginger, two hundred and fifty grams; the four spices—that is to say, a mixture of cloves, nutmeg, black pepper, and cinnamon—two hundred and fifty grams; Sumatra or Cayenne pepper, two hundred and fifty grams; acetate of potash, six hundred grams. The composition of the bath may, however, be varied by causing to enter into it any one or more of the species of aromatic non-toxic plants, such as piperaceæ, polygonaceæ, &c., and, generally speaking, the immense family of the composites. The meat is withdrawn from the bath after an immersion of one or two seconds and then dried by any suitable means, such as currents of air. It has not been rendered inalterable for an indefinite period, subject only to its being protected from moisture. It is ready for reduction to a powder of any degree of fineness, thereby enabling agglomerants to be formed in the shape of tablets, or it may be poured into jars, flagons, or the like.

The process above described is equally applicable to the preservation of meat in the piece or quarter.

What I claim, and desire to secure by Letters Patent, is—

The herein-described process of preparing an alimentary product which consists in first grating raw meat, then mixing it with a suitable flour, and then subjecting the meat and flour adhering thereto to the action of a sterilizing bath composed essentially of vinegar, salt, ginger, spices and acetate of potash.

In testimony whereof I have hereunto set my hand, in presence of two subscribing witnesses, this 3d day of June, 1898.

FÉLIX GROGNET.

Witnesses:
 EDWARD P. MACLEAN,
 VICTOR MABRAY.